United States Patent [19]
Preiss

[11] 3,862,418
[45] Jan. 21, 1975

[54] APPARATUS AND METHOD FOR USING THE SAME TO ASCERTAIN THE ANGULAR POSITION OF A DISCONTINUITY IN THE MEDIUM SURROUNDING A TEST BORE

[76] Inventor: Kenneth Preiss, 16 Rottem St., Omer, Israel

[22] Filed: Nov. 12, 1973

[21] Appl. No.: 414,625

[30] Foreign Application Priority Data
Nov. 15, 1972 Israel..................................... 40846

[52] U.S. Cl................... 250/267, 250/269, 250/515
[51] Int. Cl............................................... G01t 1/16
[58] Field of Search .......... 250/253, 261, 262, 269, 250/270, 272, 358, 360, 515, 267

[56] References Cited
UNITED STATES PATENTS
3,223,968  12/1965  deShazo............................. 250/269
3,564,251  2/1971   Youmans............................ 250/269

*Primary Examiner*—James W. Lawrence
*Assistant Examiner*—Davis L. Willis
*Attorney, Agent, or Firm*—Donald M. Sandler

[57] ABSTRACT

After the depth of a discontinuity in the medium surrounding a test bore has been ascertained using a probe carrying an omnidirectional radiation source and a detector responsive to back scattering from the medium, the aximuthal location (i.e., the aximuth of the discontinuity relative to the axis of the bore) is ascertained by limiting the field of view of the detector with a shield having a radiation transparent window that extends circumferentially around the probe up to 180° of arc, and angularly displacing the shielded probe through 360° at the predetermined depth of the discontinuity. By noting the output of the detector as a function of azimuthal location, the angular position of the discontinuity can be determined. The invention includes a shield, the combination of a shield with the probe, and the method of using such combination.

12 Claims, 8 Drawing Figures

Patented Jan. 21, 1975

Patented Jan. 21, 1975

APPARATUS AND METHOD FOR USING THE SAME TO ASCERTAIN THE ANGULAR POSITION OF A DISCONTINUITY IN THE MEDIUM SURROUNDING A TEST BORE

This invention relates to apparatus for and a method of ascertaining the integrity of a cast-in-place concrete pile, and more particularly ascertaining the angular position of a discontinuity in the concrete surrounding a test bore in the pile.

In one form of constructing a cast-in-place pile for supporting structures, a pile hole is drilled to the required depth and optionally, filled with a colloidal clay sealant such as a bentonite slurry. A metal casing may be sunk into the ground to retain the sides of the pile hole, and/or a metal cage of axial reinforcing rods held together by spiral reinforcing may be positioned adjacent the edge of the casing if present, or the walls of the hole if no casing is used. In order to fill the pile hole with concrete, a tremie funnel is placed axially in the hole with the bottom edge adjacent the bottom of the hole. In a continuous concreting operation, concrete is dumped into the top of the funnel, and the funnel, and the casing if present, are slowly lifted in synchronism so that their free ends are at all times within the freshly poured concrete. If a slurry is present, it is pumped out of the hole simultaneously with the concreting process. The process continues until the hole is completely filled with concrete, and the casing if used, and the funnel have been withdrawn.

With piles of considerable length and diameter, large pieces of equipment must be properly operated in order to synchronize the placing of the concrete with the lifting of the funnel and the casing. Depending upon the planning of the concreting, the skill of the operators of the equipment and the soil conditions involved, it is possible for the finished pile to contain concealed defects. For example, if the funnel and casing are withdrawn too rapidly, soil may shift into the hole and be sandwiched between layers of concrete producing an occlusion that is usually concealed deep within the pile. Such an occlusion locally weakens the pile which, as a result, may settle under load resulting in cracking of the structure built on the pile cap. This result may occur long after the casting of the pile requiring extremely costly repairs to the foundation and structure. The possibility of latent defects of the type described above, and the resultant delays in construction occasioned when such defects are discovered and the high cost of repairs, usually justify a non-destructive examination of the pile.

A conventional approach to the non-destructive examination of a pile is to obtain a core sample after the concrete has hardened using a standard 3-inch diameter or NX diamond core drill. This approach works reasonably well except that voids out-of-line with the bore cannot be ascertained, and the samples actually obtained are often subject to varying interpretations.

In an effort to provide a further test or verification of the core sampling technique, it has been proposed to employ radio-isotopic methods such as neutron or gamma ray back-scattering techniques. For these purposes it is convenient to cast in place in the pile a plurality of steel or plastic pipes that eventually become the bores for the probes thus eliminating the need for drilling.

In neutron backscattering, occlusions of soil in a concrete matrix are detectable by reason of the interaction of the neutrons with the hydrogen in water contained in the soil. Gamma ray backscattering, on the other hand, detects differences in density that arise due to the presence of a relatively less dense occlusion in the relatively more dense concrete matrix. In both cases, occlusions are located by inserting a probe comprising an omnidirectional radio-isotope source and a detector into a test bore and then effecting an axial traverse of the bore while noting the output of the detector as a function of the axial displacement of the probe. This approach will locate the axial position of an occlusion, but will provide no information on its azimuthal location (i.e., the angular position of the discontinuity relative to the axis of the test bore) thereby providing little assistance in planning in-situ repairs. Stated otherwise, the conventional approach indicates only the depth at which repairs may be required without indicating the location at which excavation in the soil surrounding the pile, or drilling into the pile itself, should be carried in order to reach the occlusion by the most direct route in order to effect visual inspection of and/or repairs to an occlusion in the least expensive and most expeditious manner.

Gaining knowledge of the azimuthal location of an occlusion in concrete surroundings a test bore is therefore of great economic value and constitutes an object of the present invention.

According to the present invention, there is provided a shield for limiting the azimuthal field of view of a radiation detector carried in a probe containing an omnidirectional radiation source comprising: a tubular cylindrical metallic sleeve having means defining a radiation transparent window that extends axially along the sleeve and circumferentially up to 180° of arc.

When the shield is attached concentrically in a fixed angular position on an axially extending tubular housing environmentally sealed at each end, and there is associated with the housing a lead plug interposed between an omnidirectional radio-isotope source and a detector of radioactivity, a directionally sensitive probe is created. That is to say only backscattering originating in a sector defined by the window in the shield will be detected. By providing means for rotating the shielded probe and indicating the angular position of the window with respect to a reference, the azimuthal location of an occlusion can be ascertained.

When the shield is removably mounted on the housing, the method for ascertaining the azimuthal location of an occlusion may include the prior step of using the unshielded probe to establish the axial position of the occlusion in a test bore. If the shield is fixedly mounted on the housing, some other arrangement, perhaps a separate unshielded probe, would be required to establish the depth of the occlusion.

The window of the shield may be in the form of a longitudinally extending slot in a radiation absorbing medium. For use with a gamma ray source, the radiation absorbing medium is preferably a lead coating about 2 mm. thick; while for use with a neutron source, the sleeve is a longitudinally slit tube of cadmium.

Embodiments of the invention are illustrated by way of example in the accompanying, wherein.

Figure 1:
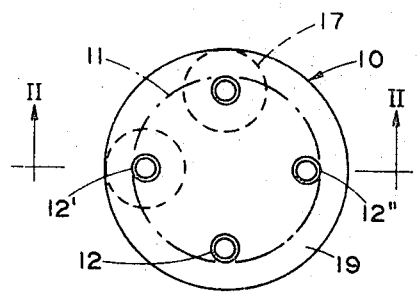
FIG. 1 is a top view of a cast-in-place concrete pile showing a plurality of steel pipes that define the bores for checking the integrity of the pile.
Figure 2:
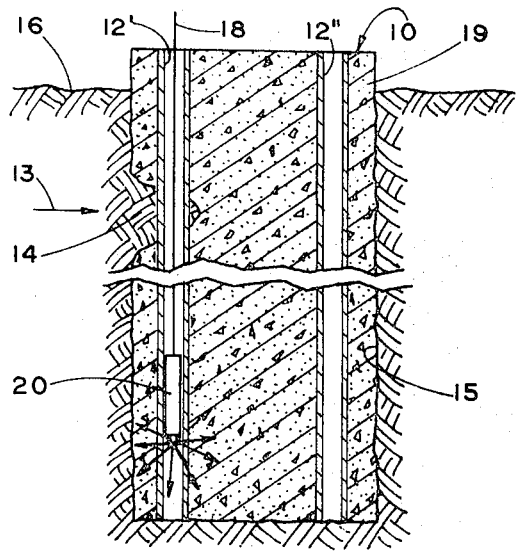
FIG. 2 is a sectional view of a cast-in-place concrete pile taken along the section II—II of FIG. 1 and showing a typical occlusion within the pile.

Referring now to FIG. 1, reference numeral 10 designates a pile cast-in-place by the process described above in which the optional reinforcing has been used. Accordingly, pile 10 comprises a steel reinforcing cage 11, a plurality of steel or plastic pipes 12, typically about 2 inches in diameter, placed adjacent to the cage and defining a plurality of test bores, and a mass of hardened concrete 19 contained within the pile hole 15. As can be seen in FIG. 2, the pile, adjacent pipe 12' in the vicinity of arrow 13, has a discontinuity 14 in the form of an occlusion of earth that may have accidentally shifted into the pile hole 15 during the casting process. Being below grade level indicated by line 16, the discontinuity in the concrete is not apparent from visual inspection of the completed pile. Depending on the extent of the occlusion and its location, the integrity of the pile and its ability to perform its intended function may be jeopardized unknowingly.

A non-destructive test of the pile can be carried out using a gamma ray backscattering technique employing the probe to be described in detail below. Probe 20, according to the present invention, is lowered into each test bore defined by pipes 12 by a cable 18 for the purpose of obtaining a backscattering profile associated with the test bore. The effective region contributing to the output of the probe is limited; and in FIG. 1 the limit is shown schematically by circle 17. Depending on the spacing of the pipes adjacent the periphery of the pile, most of the periphery of the file can be examined. It is in this peripheral region that the likelihood is the greatest of occlusions due to the shifting of soil during the casting process.

Using a cesium 137 radioactive source, it has been found that 50% of the output signal is derived from material located in a 3 to 4 cm deep annular region of the medium surrounding the test bore, while the remaining 50% is derived from material located in a 9 to 12 cm deep annular region outside the first mentioned annular region. Thus, the cylinder of influence is approximately 25 cms in diameter when a standard 2-inch steel pipe defines the test bore, but the contribution of material within this cylinder of influence is non-linear and is weighted towards the center of the test bore.

Figure 3:
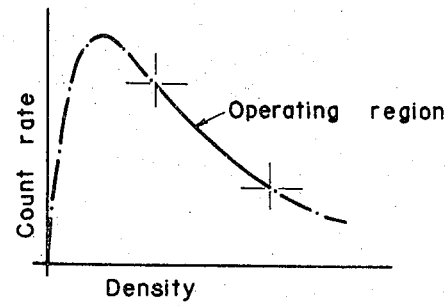
FIG. 3 is a response characteristic of the detector used with the probe of the present invention.

It has been found that the count rate is functionally related to density in the matter shown generally in FIG. 3. When the spacing from the source to the detector is properly selected, increased in density of the material surrounding the probe will be manifested by decreases in the count rate and the probe will operate on the negative slope of the curve which is essentially linear.

At this point, it should be mentioned that the above described backscattering technique will permit a qualitative determination to be made as to whether there is concrete or a void in the concrete within the cylinder of influence surrounding the test bore as shown in FIG. 1, thus uncovering gross faults. This technique, however, will provide very little information on the actual strength of the concrete since the backscattering effect is essentially independent of the strength except as it relates to density. In other words, the lack of void around the test bore provides no quantitative evidence of whether the concrete that is present meets a specific strength standard.

Figure 4:
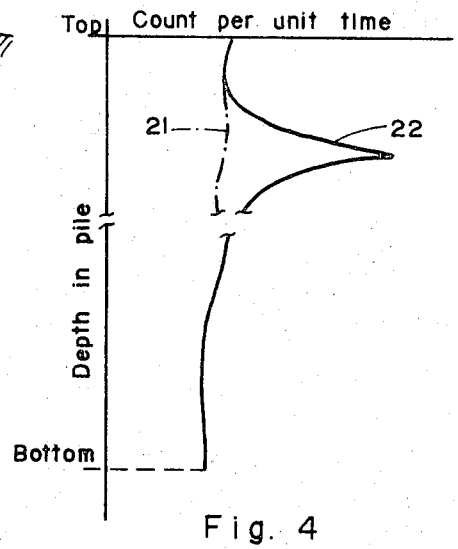
FIG. 4 is a typical graph obtained with a probe showing a curve obtained when an occlusion is present and a curve obtained when an occlusion is absent.

By causing probe 20 to traverse the pipes 12 in succession, a series of profiles can be obtained providing information on the periphery of the pile. In FIG. 4, profile 21 represents a typical curve obtained from test bore 12'' where the concrete has properly filled the pile hole 15 adjacent the bore. On the other hand, profile 22 is representative of a curve obtained using test bore 12' adjacent the occlusion 14. The presence of such occlusion is manifested by a localized increase in the count rate of the detector at the depth of the occlusion. Actually, the backscattering method provides an integrated "look" at the material surrounding the test bore so that the presence of the occlusion affects the probe detector both above and below the level of the occlusion, thus spreading the curve as indicated in FIG. 4.

Figure 5:
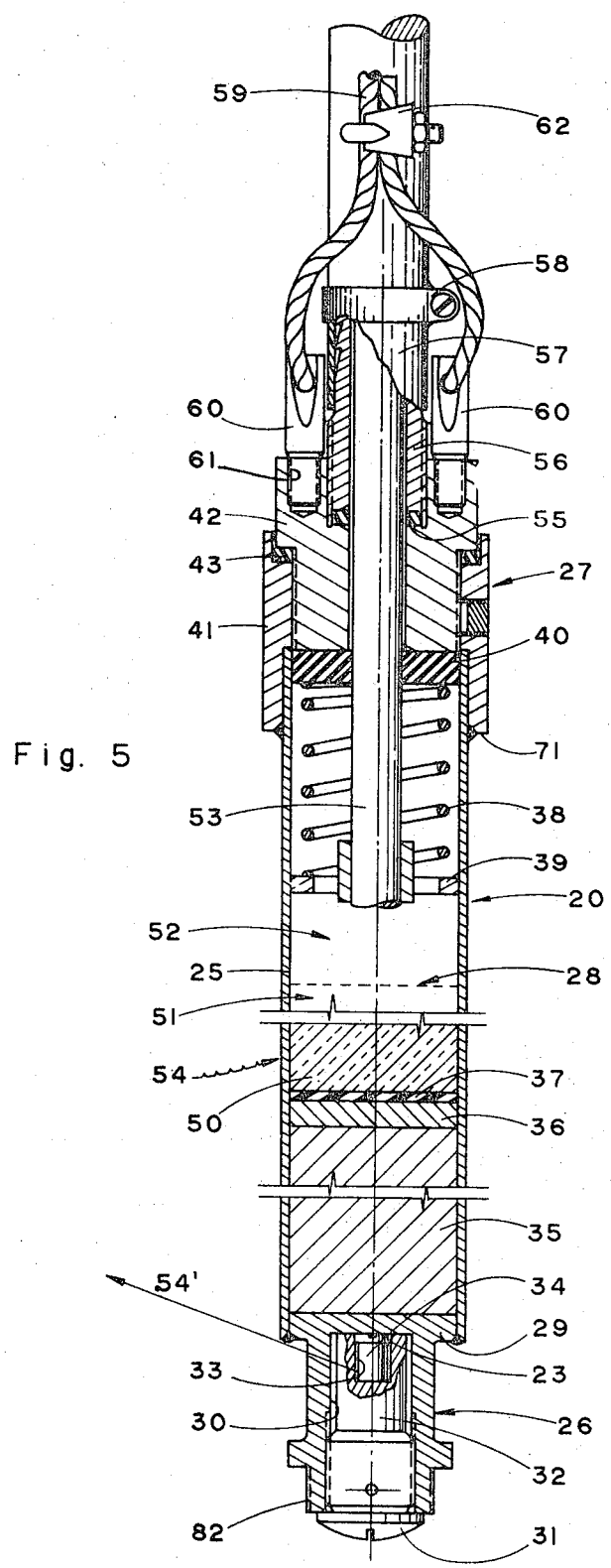
FIG. 5 is a sectional view of a probe according to the present invention.

Turning now to probe 20 shown in detail in FIG. 5, the structural components comprise a tubular housing 25, a pair of closures 26 and 27 at opposite ends of the housing, and an electronic package 28. Housing 25 is preferably a tube of stainless steel having a diameter of 1½ inches, although the range of diameters is from ¾ inches to 3½ inches to fit the inside standard steel or plastic pipes that can be utilized as test bores and cast in place in the pile. The length of the tube 25 depends on the type of electronic package utilized, but the preferred length is about 50 cms.

Bottom closure 26 is generally cup-shaped and has a flange 29 at the closed end of the cup welded to the housing thus sealing its lower end. Axial bore 30 within the closure is threaded to receive a plug 31 defining a recess for the source. Plug 31 comprises an headed screw mating with the thread in bore 30, and having an inner rod 32 of a diameter smaller than the diameter of bore 30. The free end of rod 32 is counter bored to define a threaded recess 33 for receiving a capsule 34 housing the radioactive source. A cap 23 threaded in recess 33 retains capsule 34 therein. Thus, a capsule 34 containing a suitable source is first inserted into the counter bored hole at the free end of rod 32, cap 23 is threaded in place, and plug 31 may then be screwed into the threads in the cup-shaped member 26.

Located within the housing 25 and resting against the flange 29 of the closure member 26 is a lead cylinder 35 which, with a cesium 137 source in recess 33, is preferably about 15 cms. long and completely fills the cross-section of the housing. Atop the plug 35 is preferably disc 36 of silver, tin or cadmium about 2 mm. thick which acts as a shield that absorbs secondary radiation produced by the lead plug 35 when the latter is irradiated by the source. The electronic package 28 whose construction is detailed below, is separated from the disc 36 by a rubber gasket 37, and is shock mounted within the housing 25 by means of a coil spring 38 compressed between a washer 39 backing against the package 28, and a rubber disc 40 held in place at the top end of the housing 25 by means of the top closure 27. The latter comprises a sleeve 41 welded to the outside of the tube 25 and provided with internal threads for the reception of a metal plug 42 which is tightened against a rubber gasket 43 captured between overlying shoulders on each of plug 42 and sleeve 41. Plug 42 may be provided with flats to permit a wrench to be used to tighten the plug against the gasket.

Referring now to the electronic package 28, the preferred configuration is a stacked arrangement comprising scintillator crystal 50, and photomultiplier 51 adjacent thereto, followed by a preamplifier 52 all connected by cable 53 to externally located standard circuitry (now shown) that includes a high voltage power supply, a linear amplifier, a pulse height selector or discriminator, and a scaler-timer and/or a rate meter. Crystal 50 is preferably a standard thallium activated sodium iodide crystal about 1 inch in diameter by about 2 or 3 inches long. When the probe is operating, the crystal receives backscattered radiation indicated by arrow 54 as a consequence of primary radiation from the source indicated by arrows 54', but is shielded from the primary radiation by lead plug 35.

The cable 53 passes through an axial hole in plug 42 and is sealed by a rubber gasket 55 pressed into a threaded counter bore surrounding the axial hole by a threaded tube 56 through which the cable passes. Finally, a waterproof sheath 57 passing over the cable is held to the serrated free end of tube 56 by a clamp 58 providing environmental protection for the cable.

To support the probe by steel cable 59, a pair of support pins 60 are provided. Each pin 60 is threaded at one end for insertion into one of a pair of threaded holes 61 in the top of plug 42. The end of pin 60 opposite the threaded end is provided with a transverse opening through which the free end of cable 59 passes to form a loop established by cable clamp 62. In this manner, cable 59 permits the probe to be lowered or raised relative to a test bore without imparting any strain on the electrical cable 53.

In an alternative arrangement, an armored electrical cable could be used. In such case, cable 59 could be dispensed with, and the probe raised or lowered by means of the armored cable.

When operating with a cesium 137 source in the recess the length of the lead plug preferably is in the range 12 to 25 cms. As indicated above, this will establish the operating point on the negative slope of the response curve as seen in FIG. 3. The probe is now ready for use in the test bore and may be lowered and raised therein by reason of cable 59. The output of photomultiplier 51 can be visually read on a meter, or recorded on a chart synchronized with the vertical movement of the probe.

The preferred source is cesium 137 of from 1 to 2 millicurie intensity for gamma ray backscattering investigations. Sources other than cesium 137 can be used, and the intensity may vary between 0.5 and 50 millicuries.

While a scintillation detector is preferred, any other radiation detector such as Geiger-Muller tube could be used although the sensitivity of such a tube is significantly less than the sensitivity of a scintillation detector with the result that a more powerful radioactive source is required for the equivalent output. And, while reference is made to a thallium activated sodium iodide scintillation crystal, crystals other than this type can of course be utilized.

Figures 6, 7:
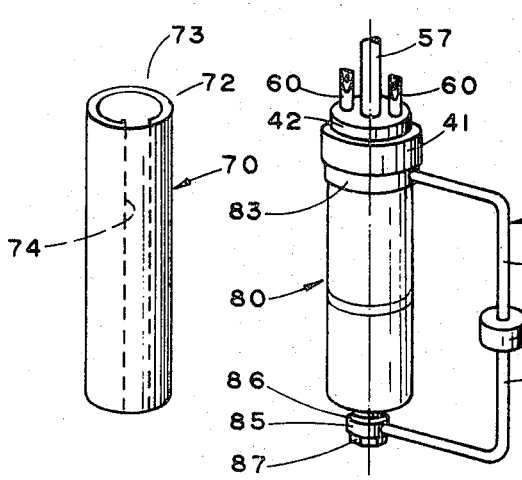
FIG. 6 is a perspective view of a sleeve for use with the probe shown in FIG. 5.
FIG. 7 is a modification of the probe shown in FIG. 5 for the purpose of checking the density of a slurry within the pile hole.

Turning now to the problem of obtaining information on the precise angular location of an occlusion detected at some depth by a gamma ray backscattering probe, reference is made to FIG. 6 which shows an attachment that may be utilized with the probe. Attachment 70 includes a sleeve 72 preferably of stainless steel, and a sheet 73 of lead, preferably about 2 mm thick, partially encircling the sleeve and defining a gamma ray transparent window 74 that extends axially along the sleeve and circumferentially up to 180°. The sheet may be attached by an epoxy adhesive to either the interior or the exterior of the sleeve 72. Attachment 70 has an internal diameter just larger than the housing, and can be passed over the housing until shoulder 71 of sleeve 41 abuts sleeve 72. A suitable nut (not shown) mating with threads 82 on the free end of member 26 may be employed to removably retain attachment 70 on the housing of the probe.

A cooperating notch and recess (not shown) or other expedient may be provided on sleeve 41 and 72 to orient window 74 and establish a directionally sensitive probe. The directional sensitivity arises because the detector crystal will respond only to that radiation passing through the window. One of the pins 60 may then be removed from the plug 42 and an extension rod (not shown) can be screwed into the recess 61 to establish a rigid connection between the extension rod and the probe. Rotation of the rod, which will project from the test bore, rotates the probe about its longitudinal axis permitting the probe to be used to provide an azimuth map of density surrounding a test bore. The extension rod should have on the portion projecting from the test bore, a mark indicating the location of the window. In this way the angular position of the window is indicated remotely with respect to a reference on the test bore.

Apparatus 70 would be utilized only after the probe has located an occlusion in a test-bore and determined its depth. The probe would be withdrawn, the attachment 70 connected to the housing as described above, and the extension rod connected to the plub 42. After this, the modified probe would be lowered into the test bore to the depth of the occlusion as determined previously, and the probe would then be rotated through 360° at that depth while recording the output of the detector. in this manner the angular position of the occlusion can be determined.

The basic probe can also be used for ascertaining the density of bentonite in the slurry contained within a pile hole or a slurry wall prior to concreting. In order to rig the probe for this use, the plug 31 containing the source is removed and extension 81 is attached to the probe. As shown in FIG. 7, extension 81 comprises upper ring 83, U-shaped rod 84, and lower collar 85. Ring 83 has an inner diameter just larger than the outer diameter of the housing of the probe permitting the ring to slide up into engagement with shoulder 71 of sleeve 41. When collar 85 abuts shoulder 71, collar 85 will abut flange 86 on member 26 permitting nut 87 to be screwed onto threads 82 on member 26, thus securely fastening the extension to the housing. Portion 88 of rod 84 will be parallel to the axis of the housing, and is provided with an annular container 89 within which a radio-active source such as cesium 137 can be inserted.

In use, the modified probe designated by reference numeral 80 would be lowered into the Bentonite slurry whose density can be ascertained from the gamma ray absorption occurring in the region between the annular container 89 and the detector housed within the probe body. When recorded on a chart, a written record of compliance with contractural specifications will be available.

Neutron backscattering can also be used for testing piles, as indicated above, when the pile has been sunk in a clay-type soil. In such case, the basic probe previously described can be used, but a neutron source would replace the gamma ray source and a detector for detecting slow or thermal neutron radiation would replace the NaI(Tl) scintillator crystal. A suitable neutron source would be a mixture of americum 241 and beryllium, and a suitable intensity would be 100 millicuries. Other sources and other intensities may be used, however. A suitable detector is a $BF_3$ tube. Other detectors could be used, as for example, a $He^3$ tube, or a fission chamber, or a scintillation crystal responsive to neutrons.

Figure 8:
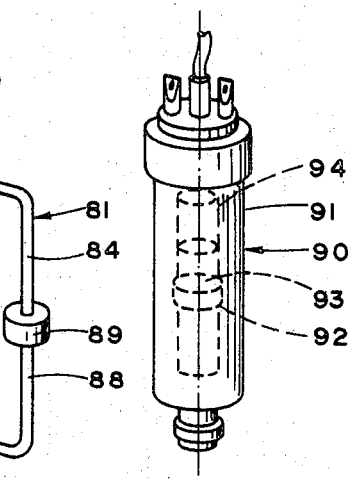
FIG. 8 is a modified probe for neutron backscattering analysis.

Instead of mounting the neutron source in the manner described above, it is also possible to incorporate the source into an annular ring around the detector. This arrangement is shown in FIG. 8 wherein probe 90 comprises a housing 91 like housing 25 of probe 20, and annular source of neutrons 92 surrounding neutrons 93, the electronic package being designated by reference numeral 94.

In operation, the neutrons from the source interact with the hydrogen in water molecules present in the pile, which molecules are usually more prevalent in an occlusion of clay than in concrete. The interaction of the neutrons with the water molecules produces neutrons of lower energy. The detector discriminates against the high energy neutrons of the source and responds only to the slower neutrons that result from backscattering. Thus, the probe 90 can be used to obtain profiles along the test bore in the same manner as probe 20 is used.

Furthermore, the angular position of an occlusion can be determined by using with probe 90, an attachment of the type shown in FIG. 6 except that the shield for the neutrons is a sheet of cadmium about 0.02 inches thick that defines a semi-circular neutron window. Once the presence of an occlusion has been established, its angular position in the test bore can be established using probe 90 modified by a cadmium-clad sleeve following the procedure described above in connection with the use of attachment 70.

What is claimed is:

1. A shield adapted to be removably attached to the outside of a probe having a cylindrical housing containing an omnidirectional radiation source, a detector responsive to back-scattered radiation, and a plug for absorbing radiation from the source arranged in the housing so that the source is adjacent one axial end of the probe and the plug is interposed between the source and the detector, the shield comprising: a tubular cylindrical metallic sleeve that overlies the detector, said sleeve having means defining a radiation transparent window that extends axially along the sleeve and circumferentially up to 180° of arc.

2. A shield according to claim 1 wherein the window is defined by a longitudinally extending slot in a radiation absorbing medium that extends circumferentially through less than 180° of arc.

3. A shield according to claim 2 wherein the sleeve has a lead coating about 2 mm. thick for absorbing gamma rays.

4. A shield according to claim 2 wherein the metallic sleeve is the radiation absorbing medium and is cadmium.

5. Apparatus for locating a discontinuity in the medium surrounding a test bore comprising: a probe having an axially extending tubular housing environmentally sealed at each end; an omnidirectional radiation source associated with the housing; a radiation detector and a radiation absorbing plug associated with the housing and arranged so that the plug is interposed between the source and the detector; an electrical cable passing through an end of the housing for operating the detector; a shield removably mounted on the housing in an axial position that overlies the detector and in a fixed angular position; said shield comprising a cylindrical metallic sleeve having means defining a radiation transparent window that extends axially along the sleeve and circumferentially up to 180° of arc; and means for rotating the combination of the shield and probe so as to indicate the angular position of the transparent window with respect to a reference.

6. Apparatus according to claim 5 wherein the window is defined by a longitudinally extending slot in a radiation absorbing medium that extends circumferentially through less than 180° of arc.

7. Apparatus according to claim 6 wherein the radiation absorbing medium is a lead coating about 2mm. thick.

8. Apparatus according to claim 6 wherein the metallic sleeve is the radiation absorbing medium and is cadmium.

9. A method for locating a discontinuity in a medium surrounding a test bore comprising the steps of:
   a. lowering into the test bore a probe having a cylindrical housing containing an omnidirectional radiation source, a detector responsive to backscattered radiation, and a plug for absorbing radiation from the source arranged in the housing so that the source is adjacent one axial end of the probe and the plug is interposed between the source and the detector;
   b. ascertaining the depth of a discontinuity by noting the output of the detector as a function of depth;
   c. withdrawing the probe from the test bore after the depth of a discontinuity has been ascertained and mounting on the probe, at a fixed angular position, a removable shield comprising a tubular metallic sleeve that overlies the detector and has a radiation transparent window extending axially along the sleeve and circumferentially up to 180° of arc;
   d. lowering the combination of the probe and the removable shield into the test bore to the depth of the discontinuity determined in accordance with step (b); and
   e. rotating the combination of the probe and shield through an angular displacement while noting the output of the detector as a function of the angular displacement of the combination for ascertaining the azimuthal location of the discontinuity.

10. The method according to claim 9 wherein the window in the shield is defined by a longitudinally extending slot in a radiation absorbing medium that extends circufmerentially through less than 180° of arc.

11. The method according to claim 10 wherein the radiation absorbing medium is a lead coating about 2mm. thick and the shield is axially spaced from the source.

12. The method according to claim 10 wherein the metallic sleeve is cadmium.

* * * * *